Patented June 23, 1942

2,287,522

UNITED STATES PATENT OFFICE 2,287,522

PURIFICATION OF CAMPHOR

Clyde O. Henke, Wilmington, and Gastao Etzel, Newark, Del., assignors to E. I. du Pont de Nemours & Company, Wilmington, Del., a corporation of Delaware No Drawing. Application October 4, 1939, Serial No. 297,956

4 Claims. (Cl. 260—589)

This invention relates to the purification of both natural and synthetic camphor and more particularly it relates to a process of refining camphor to a desired melting range and freedom from color forming impurities by a method involving chemical treatment and fractional distillation. This is a continuation in part of the present inventors' application, Serial Number 99,163, filed September 2, 1936.

Old and well known procedures for purifying crude natural and synthetic camphor, such as by sublimation, steam distillation, fractional distillation, solvent extraction and recrystallization are found to be unsatisfactory for refining camphor that has to meet certain present day requirements, particularly a freedom from color forming impurities. While impure camphor may be directly treated by the process of this invention, preferably we treat camphor dissolved in suitable solvents. For example, this process is well suited for the purification of camphor which remains dissolved in the mother liquor that is left after preparation of U. S. P. grade camphor by recrystallization from solvents. Also, highly satisfactory for treatment by our process are solutions of crude synthetic camphor which result from manufacturing procedures such as the following; in which camphene is esterified to give an isoborneol ester, the ester being saponified to form isoborneol, and the isoborneol in a solvent such as benzene-cyclohexane mixture being in turn dehydrogenated, preferably in the presence of a dehydrogenation catalyst, to form a benzene-cyclohexane solution of crude synthetic camphor.

Therefore, while it is within the general purpose of this invention to provide a process for preparing refined camphor substantially free from color forming impurities by direct treatment of crude camphor in any commonly occurring form, a more particular object is to provide a process for preparation of refined camphor by treatment of crude camphor remaining in mother liquors from camphor refining processes and by treatment of solutions of crude camphor which are obtained in the manufacture of synthetic camphor.

These objects are accomplished by heating the crude camphor, preferably in solution, in the presence of caustic soda or caustic potash prior to or during a distillation procedure. Dry distillation of camphor in the presence of lime has been practiced since ancient times, but applicants have discovered that caustic soda and caustic potash are far more effective assistants in the production of refined camphor by either wet or dry distillation methods. The caustic alkalis apparently react with impurities in the crude camphor to alter their boiling points and so cause them to more completely separate from camphor, as the camphor is distilled. The resulting refined camphor has a melting point more nearly that of chemically pure camphor and when used as a plasticizer for bleached cellulose nitrate gives a plastic that is characteristically free from discoloration.

As an example of preferred procedure, we cite the following refining treatment:

50 parts of crude camphor benzene-cyclohexane mixture (20 parts of benzene-cyclohexane and 30 parts camphor) were mixed with 1 part of 30% caustic soda solution. The mixture was fractionally distilled. Benzene-cyclohexane and water distilled off first, followed by terpene and high boiling impurities, leaving camphor and high boiling impurities in the still. The camphor was then distilled off leaving the high boiling impurities. During the distillation of the camphor the temperature was maintained at 200°–205° C. for a period of 48 hours. The resulting distilled camphor had a 10° higher melting point (168°–170° C.) and gave a nitrocellulose plastic free or nearly free from discoloration as compared to the starting material. The same procedure was carried out in the absence of caustic soda. Camphor melting at 158°–160° C. was obtained. When this latter product was used to make a cellulose nitrate plastic, a discolored material was produced. All parts in the foregoing procedure are by weight.

Other detailed examples in which parts are by weight follow:

Example I

Twenty-five parts of crude synthetic camphor in benzene-cyclohexane solution were charged into an iron still with 1 part of 30% caustic soda solution. The mixture was fractionally distilled. The temperature in the still after the removal of the solvent was maintained at 225° C. for 40 hours.

The refined camphor melted at 172°–174° C. and gave a cellulose nitrate plastic free or nearly free from discoloration. Some of the same original camphor benzene-cyclohexane solution, when fractionally distilled in the absence of caustic, gave a product melting at 160.1°–163.2° C. that produced a decidedly discolored cellulose nitrate plastic.

Example II

One hundred parts of camphor (M. P. 160°–164.2° C.) which gave, upon the addition of cellulose nitrate a discolored plastic, were distilled in the presence of 1 part of flaked caustic soda. The distillation was carried out at 185°–190° C. The time required for the distillation was 35 minutes. The distilled camphor melted at 161°–164.3° C. and when used to make cellulose nitrate plastic gave a product which showed only traces of discoloration.

Example III

A benzene-cyclohexane solution of crude synthetic camphor was fractionally distilled until only the impure camphor remained. This camphor residue was then distilled in the presence of 1% of its weight of flaked caustic soda. A temperature of 190° C. was used during the distillation. The so refined camphor produced a cellulose nitrate plastic nearly free from discoloration.

Example IV

Ten parts of natural camphor (M. R. 176°-177° C.), 1 part of caustic potash, 1 part of water and 10 parts of benzene were charged into a 5 liter flask. The mixture was refluxed for 1 hour and then a portion of benzene and water was distilled off. When the temperature in the still reached 180° C. steam was introduced and the camphor steam distilled at that temperature. Benzene and water was then fractionally distilled from the camphor and it was found that the refined product had a melting range of 177°-178° C. and was practically free from color forming impurities. Prior to treatment this camphor produced discolored nitrocellulose plastic.

Example V

Two hundred parts of synthetic crude camphor (M. R. 160°-162° C.), 1 part of potassium hydroxide and 60 parts of alcohol were charged into a 5 liter flask. The alcohol was fractionally distilled off and the camphor distilled from the caustic potash residue. The resulting refined camphor was considerably improved as far as color forming impurities were concerned, and the melting range was 164°-166° C.

Temperature and time of contact and to some extent the proportion of alkali are important in our process.

Experiments have shown that as little as 0.1% of caustic soda or caustic potash based on the weight of the crude camphor produces a noticeable improvement in camphor intended for the production of color-free cellulose nitrate plastics. Large proportions of caustic are objectionable for manipulative and economic reasons and are unnecessary for removal of color forming impurities. About 5% of caustic soda or caustic potash appears to be the maximum required and as indicated in the preferred procedure, about 1% of alkali metal hydroxide, based on the weight of crude camphor, is found to be the most desirable ratio under average conditions. When camphor is heated in the presence of caustic soda or caustic potash at a temperature ranging from about 250° to 280° C., the sodium or potassium salt of campholic acid is formed. Applicants have discovered that when the camphor is heated with caustic soda or caustic potash at a temperature below 230° C. this reaction with campholic acid does not occur, and a highly desirable refined camphor is obtained by either wet or dry distillation methods. The temperatures in our process may be varied from 100° C. to 230° C., depending on the manner in which the purification is carried out and the type of refined camphor that is required. If the desired object is to remove only certain impurities which discolor camphor, temperature as low as 100° C. may be sufficient. If, on the other hand, a higher melting point camphor is desired, which would at the same time produce a nitrocellulose plastic free or nearly free from discoloration, a higher temperature such as 185° C.-225° C. should be used.

The time of contact of the camphor and alkali may be varied from ½ hour to 50 hours, depending on the temperature and the amount of caustic used, and on the nature of the refined camphor desired. In other words, the duration of treatment may be limited to the time required to distill the camphor, or hours of preliminary refluxing may be necessary.

In general, it may be stated that when notable improvement in the melting point (total purification) along with removal of color forming agents is the object, higher temperatures, longer heating, and a greater proportion of alkali are in order. Small ratios of alkali, lower temperatures, and shorter periods of contact between the camphor and caustic all tend to reduce the total amount of impurities reacted, but effectively alter the color forming compounds and make them easily separable by distillation.

Benzene, cyclohexane, and mixtures thereof, alcohol, and other solvents of camphor which can be separated from camphor by distillation and which are unreactive with camphor and caustic alkali, are suitable for use in the process.

Any form of distillation or sublimation to separate the caustic treated camphor is applicable.

Various modifications in our invention other than already indicated may be made without departing from the scope and spirit thereof. It is to be understood that we do not limit ourselves to the specific embodiments thereof except as defined in the appended claims.

We claim:

1. The process of refining crude camphor which comprises adding to a solution of crude camphor in a solvent which is unreactive with camphor and caustic alkali, about 0.1 to 5% by weight of an alkali metal hydroxide based on said crude camphor, heating the same, distilling off the solvent and distilling off the camphor while maintaining a temperature of 185° to 230° C.

2. The process of refining crude camphor which comprises adding to a benzene-cyclohexane solution of crude camphor from 0.1 to 5% by weight of an alkali metal hydroxide based on said crude camphor, heating the same, distilling off the benzene and cyclohexane and then distilling off the camphor while maintaining a temperature of 185° C. to 230° C.

3. The process of refining synthetic camphor which comprises adding to a benzene-cyclohexane solution of synthetic camphor from 0.1 to 5% by weight of sodium hydroxide based on said synthtic camphor from a 30% caustic soda solution, heating the same, distilling off the solvent and water and then distilling off the camphor while maintaining a temperature of 185° C. to 230° C.

4. A process as in claim 1 in which the camphor treated is a solution of synthetic camphor obtained by dehydrogenation of isoborneol in an organic solvent.

CLYDE O. HENKE.
GASTAO ETZEL.